(12) United States Patent
Galbreath et al.

(10) Patent No.: US 10,353,969 B2
(45) Date of Patent: *Jul. 16, 2019

(54) IDENTIFYING RELATIONSHIPS IN AN ONLINE SOCIAL NETWORK

(71) Applicant: Facebook, Inc., Menlo Park, CA (US)

(72) Inventors: Nicholas Galbreath, Tokyo (JP); Christopher Lunt, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 345 days.

This patent is subject to a terminal disclaimer.

(21) Appl. No.: 15/001,566

(22) Filed: Jan. 20, 2016

(65) Prior Publication Data

US 2016/0140245 A1 May 19, 2016

Related U.S. Application Data

(63) Continuation of application No. 12/980,188, filed on Dec. 28, 2010, now Pat. No. 9,305,003, which is a
(Continued)

(51) Int. Cl.
| | |
|---|---|
| *G06Q 10/10* | (2012.01) |
| *G06Q 30/02* | (2012.01) |
| *G06Q 10/06* | (2012.01) |
| *G06Q 40/02* | (2012.01) |
| *G06F 16/9535* | (2019.01) |
| *G06F 16/21* | (2019.01) |
| *G06F 16/16* | (2019.01) |
| *G06F 16/28* | (2019.01) |
| *G06F 16/951* | (2019.01) |

(Continued)

(52) U.S. Cl.
CPC ........ *G06F 16/9535* (2019.01); *G06F 16/164* (2019.01); *G06F 16/21* (2019.01); *G06F 16/288* (2019.01); *G06F 16/951* (2019.01); *G06Q 30/02* (2013.01); *G06Q 30/0601* (2013.01); *G06Q 50/01* (2013.01); *H04L 67/10* (2013.01); *H04L 67/306* (2013.01)

(58) Field of Classification Search
CPC .... G06Q 50/01; G06Q 30/0601; G06Q 30/02; G06F 16/9535; G06F 16/21; G06F 16/164; G06F 16/288; G06F 16/951; H04L 67/306; H04L 67/10
USPC .................................................. 705/1.1–912
See application file for complete search history.

(56) References Cited

U.S. PATENT DOCUMENTS

| 5,708,845 A | 1/1998 | Wistendahl |
|---|---|---|
| 5,754,939 A | 5/1998 | Herz |

(Continued)

*Primary Examiner* — Jonathan P Ouellette
(74) *Attorney, Agent, or Firm* — Baker Botts L.L.P.

(57) ABSTRACT

In particular embodiments, a method comprises accessing, from a first user of an online social network, profile information of the first user comprising personal information of the first user and a visibility preference specified by the first user, wherein the visibility preference specifies a degree of separation preference and determines a flow of the first user's profile information to users of the online social network and a flow of information to the first user, identifying relationships between the first user and one or more second users of the online social network based on the personal information and the visibility preference of the first user, and further based on personal information of the one or more second users, and updating a member database with the identified relationships between the first user and one or more of the second users.

20 Claims, 8 Drawing Sheets

Related U.S. Application Data continuation of application No. 10/854,057, filed on May 26, 2004, now Pat. No. 8,010,458.

(51) Int. Cl.
| | | |
|---|---|---|
| *G06Q 30/06* | (2012.01) | |
| *G06Q 50/00* | (2012.01) | |
| *H04L 29/08* | (2006.01) | |

(56) References Cited

U.S. PATENT DOCUMENTS

| | | |
|---|---|---|
| 5,841,970 A | 11/1998 | Tabuki |
| 5,950,200 A | 9/1999 | Sudai |
| 5,963,951 A | 10/1999 | Collins |
| 5,978,768 A | 11/1999 | McGovern |
| 6,052,122 A | 4/2000 | Sutcliffe |
| 6,061,681 A | 5/2000 | Collins |
| 6,073,105 A | 6/2000 | Sutcliffe |
| 6,073,138 A | 6/2000 | de l'Etraz |
| 6,108,655 A | 8/2000 | Schleimer |
| 6,112,186 A | 8/2000 | Bergh |
| 6,175,831 B1 | 1/2001 | Weinreich |
| 6,249,282 B1 | 6/2001 | Sutcliffe |
| 6,269,369 B1 | 7/2001 | Robertson |
| 6,324,541 B1 | 11/2001 | de l'Etraz |
| 6,366,962 B1 | 4/2002 | Teibel |
| 6,370,510 B1 | 4/2002 | McGovern |
| 6,408,309 B1 | 6/2002 | Agarwal |
| 6,542,748 B2 | 4/2003 | Hendrey |
| 6,636,427 B2 | 10/2003 | Dorrie |
| 6,735,568 B1 | 5/2004 | Buckwalter |
| 6,839,680 B1 | 1/2005 | Liu |
| 7,010,599 B2 | 3/2006 | Shrinivasan |
| 7,021,534 B1 | 4/2006 | Kiliccote |
| 7,069,308 B2 | 6/2006 | Abrams |
| 7,069,310 B1 | 6/2006 | Bartholomew |
| 7,072,683 B2 | 7/2006 | King |
| 7,231,176 B2 | 6/2007 | Levy |
| 7,269,590 B2 | 9/2007 | Hull |
| 7,433,876 B2 | 10/2008 | Spivack |
| 7,539,697 B1 | 5/2009 | Akella |
| 7,580,981 B1 | 8/2009 | Golub |
| 7,634,466 B2 | 12/2009 | Rose |
| 7,669,123 B2 | 2/2010 | Zuckerberg |
| 7,680,882 B2 | 3/2010 | Tiu, Jr. |
| 7,685,198 B2 | 3/2010 | Xu |
| 7,730,143 B1 | 6/2010 | Appelman |
| 7,769,819 B2 | 8/2010 | Lerman |
| 7,797,732 B2 | 9/2010 | Tam |
| 7,904,511 B2 | 3/2011 | Ryan |
| 7,991,764 B2 | 8/2011 | Rathod |
| 8,010,460 B2 | 8/2011 | Work |
| 8,015,119 B2 | 9/2011 | Buyukkokten |
| 8,060,405 B1 | 11/2011 | Lawrence |
| 8,171,128 B2 | 5/2012 | Zuckerberg |
| 8,219,500 B2 | 7/2012 | Galbreath |
| 8,468,103 B2 | 6/2013 | Galbreath |
| 8,676,716 B2 | 3/2014 | Galbreath |
| 2002/0026478 A1 | 2/2002 | Rodgers |
| 2002/0032658 A1 | 3/2002 | Oki |
| 2002/0086676 A1 | 7/2002 | Hendrey |
| 2002/0160339 A1 | 10/2002 | King |
| 2002/0178163 A1 | 11/2002 | Mayer |
| 2003/0061294 A1 | 3/2003 | Stennicke |
| 2003/0115194 A1 | 6/2003 | Pitts |
| 2003/0135582 A1 | 7/2003 | Allen |
| 2003/0154194 A1 | 8/2003 | Jonas |
| 2003/0167324 A1 | 9/2003 | Farnham |
| 2004/0034601 A1 | 2/2004 | Kreuzer |
| 2004/0064734 A1 | 4/2004 | Ehrlich |
| 2004/0088325 A1 | 5/2004 | Elder |
| 2004/0122855 A1 | 6/2004 | Ruvolo |
| 2004/0144301 A1 | 7/2004 | Neudeck |
| 2004/0148275 A1 | 7/2004 | Achlioptas |
| 2004/0210639 A1 | 10/2004 | Ben-Yoseph |
| 2004/0215648 A1 | 10/2004 | Marshall |
| 2004/0215793 A1 | 10/2004 | Ryan |
| 2004/0236836 A1 | 11/2004 | Appelman |
| 2004/0260781 A1 | 12/2004 | Shostack |
| 2005/0055416 A1 | 3/2005 | Heikes |
| 2005/0060417 A1 | 3/2005 | Rose |
| 2005/0076241 A1 | 4/2005 | Appelman |
| 2005/0086211 A1 | 4/2005 | Mayer |
| 2005/0097170 A1 | 5/2005 | Zhu |
| 2005/0097319 A1 | 5/2005 | Zhu |
| 2005/0144279 A1 | 6/2005 | Wexelblat |
| 2005/0171955 A1 | 8/2005 | Hull |
| 2005/0198031 A1 | 9/2005 | Pezaris |
| 2005/0209999 A1 | 9/2005 | Jou |
| 2005/0216300 A1 | 9/2005 | Appelman |
| 2005/0256866 A1 | 11/2005 | Lu |
| 2005/0283753 A1 | 12/2005 | Ho |
| 2006/0048059 A1 | 3/2006 | Etkin |
| 2006/0059159 A1 | 3/2006 | Truong |
| 2006/0085370 A1 | 4/2006 | Groat |
| 2006/0015540 A1 | 6/2006 | Takeda |
| 2006/0117378 A1 | 6/2006 | Tam |
| 2006/0240856 A1 | 10/2006 | Counts |
| 2009/0024548 A1 | 1/2009 | Zhu |
| 2010/0185580 A1 | 7/2010 | Zhu |

IDENTIFYING RELATIONSHIPS IN AN ONLINE SOCIAL NETWORK

PRIORITY

This application is a continuation under 35 U.S.C. § 120 of U.S. patent application Ser. No. 12/980,188, filed 28 Dec. 2010, which is a continuation under 35 U.S.C. § 120 of U.S. patent application Ser. No. 10/854,057, filed 26 May 2004, issued as U.S. Pat. No. 8,010,458, each of which is incorporated herein by reference.

TECHNICAL FIELD

Particular embodiments generally relates to a system and method for managing information accessible online and, more specifically, to a system and method for managing information flow between members of an online social network based on their user preference settings and their relative positions within the online social network.

BACKGROUND

Over the past several years, the amount of personal information that individuals share online has increased dramatically. Many websites provide an online community that provides content focusing on a common interest or theme (e.g., a "fan site" for a television program or musical artist), and allows people to join the online community and share personal information with other members of the online community.

Online social networking sites have also been rapidly gaining in popularity. Typically, members of an online social network communicate with one another and meet other members based on personal information captured in the other member profiles.

Also, members of online social networks often request their existing friends to join, creating a web of online relationships that mirror offline ones. Operators of online social networking sites typically require that new members provide certain personal information to join, including contact information (e.g., physical and email addresses, telephone numbers, instant messaging nicknames, etc.) and identifying information (e.g. a name, location, personal interests, age, etc.).

A positive consequence of this general trend is the greater ability for groups of friends, families and other acquaintances to communicate online with, and about, each other as members of a social network. For example, a group of friends may share personal information with each other about common interests, individual personal attributes, events, schedules and activity plans and may also access each others' personal information. Another benefit of online social networks is that members can more easily find others who share common interests, goals, lifestyles, etc., without being limited to an online community dedicated to a particular interest. Doing so allows members to expand their social networks.

Many people, however, are reluctant to provide personal information to an online social network. The reasons for this reluctance are varied. Some have experienced undesired communications when submitting personal information online. For example, automated agents may be configured to scour the information available from an online social networking site to harvest email addresses and later send unsolicited email to the harvested addresses, or some members may be deluged by unwanted messages from strangers. Parents are often concerned about allowing their children to provide personal information to an online source out of the fear that it may be subsequently misused by strangers.

DESCRIPTION OF EXAMPLE EMBODIMENTS

Particular embodiments described herein provide a more appealing online environment for sharing personal information. In this environment, individuals who share their personal information also specify settings that dictate who may view their personal information and who may communicate with them.

Preferably, the environment is an online social network and the individuals are members of the online social network. The members control which other members of the online social network may view their personal information by setting a visibility preference at 1, 2, 3 or ALL. A visibility preference of 1 means that only friends of the member may view that member's personal information. A visibility preference of 2 means that only friends of the member and friends of friends of the member may view that member's personal information. A visibility preference of 3 means that only friends of the member, friends of friends of the member, and friends of friends of friends of the member may view that member's personal information. A visibility preference of ALL means that all members of the online social network may view that member's personal information.

The members also control which other members of the online social network may communicate with them by setting a contactability preference at 1, 2, 3 or ALL. A contactability preference of 1 means that only friends of the member may communicate with that member. A contactability preference of 2 means that only friends of the member and friends of friends of the member may communicate with that member. A contactability preference of 3 means that only friends of the member, friends of friends of the member, and friends of friends of friends of the member may communicate with that member. A contactability preference of ALL means that all members of the online social network may communicate with that member.

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
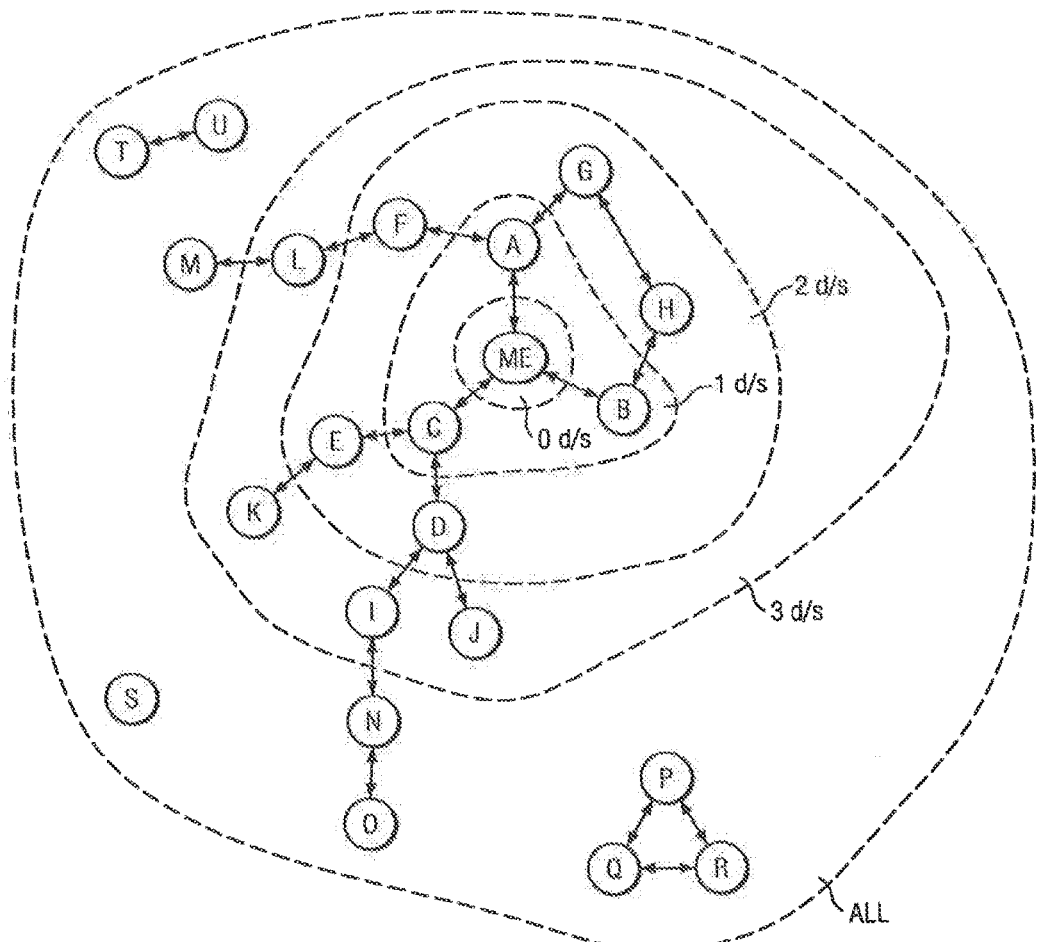
FIG. 1 is a diagram that illustrates the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, 8, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, Hand G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows, at an explosive rate and quickly begins to mirror the ALL set.

Figure 2:
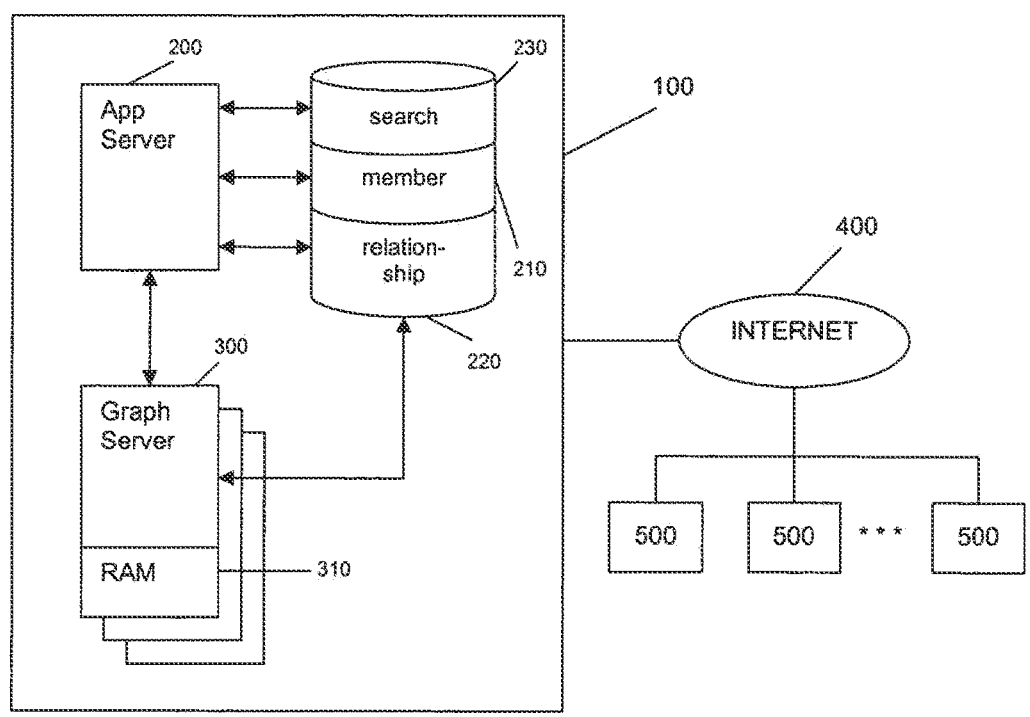
FIG. 2 is a block diagram illustrating a system for providing an online social network, according to one embodiment.

FIG. 2 is a block diagram illustrating a system for managing an online social network. As shown, FIG. 2 illustrates a computer system 100, including an application server 200 and distributed graph servers 300. The computer system 100 is connected to a network 400, e.g., the Internet, and accessible over the network by a plurality of computers, which are collectively designated as 500.

The application server 200 manages a member database 210, a relationship database 220 and a search database 230. The member database 210 contains profile information for each of the members in the online social network managed by the computer system 100. The profile information may include, among other things: a unique member identifier, name, age, gender, location, hometown, references to image files, listing of interests, attributes, etc. The profile information also includes VISIBILITY and CONTACTABILITY settings, the uses of which are described below in connection with FIGS. 4A and 4B.

The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The member database 210, the relationship database 220, and the search database 230 are depicted separately in the block diagram of FIG. 2 to illustrate that each performs a different function. The databases 210, 220, 230 may each represent a different database system, module, or software; or any two of the three or all three may be parts of the same database system, module, or software.

The application server 200 also receives and processes information exchange requests received from the remote computers 500. An information exchange request may be a request to create a new member profile, (FIG. 3), a request to view another member's profile (FIG. 4A), a request to send messages to a member (FIG. 48), or a search request (FIG. 4C). The application server 200 relies on the distributed graph servers 300 to process certain CPU-intensive tasks required to process the information exchange request.

The graph servers 300 receive a query from the application server 200, process the query and return the query results to the application server 200. The graph servers 300 manage a representation of the social network for all the members in the member database.

Detailed examples of graph servers and related components are described in detail in U.S. patent application Ser. No. 10/854,054, titled "System and Method for Managing an Online Social Network," and filed 26 May 2004, the contents of which are hereby incorporated by reference.

Figure 3:
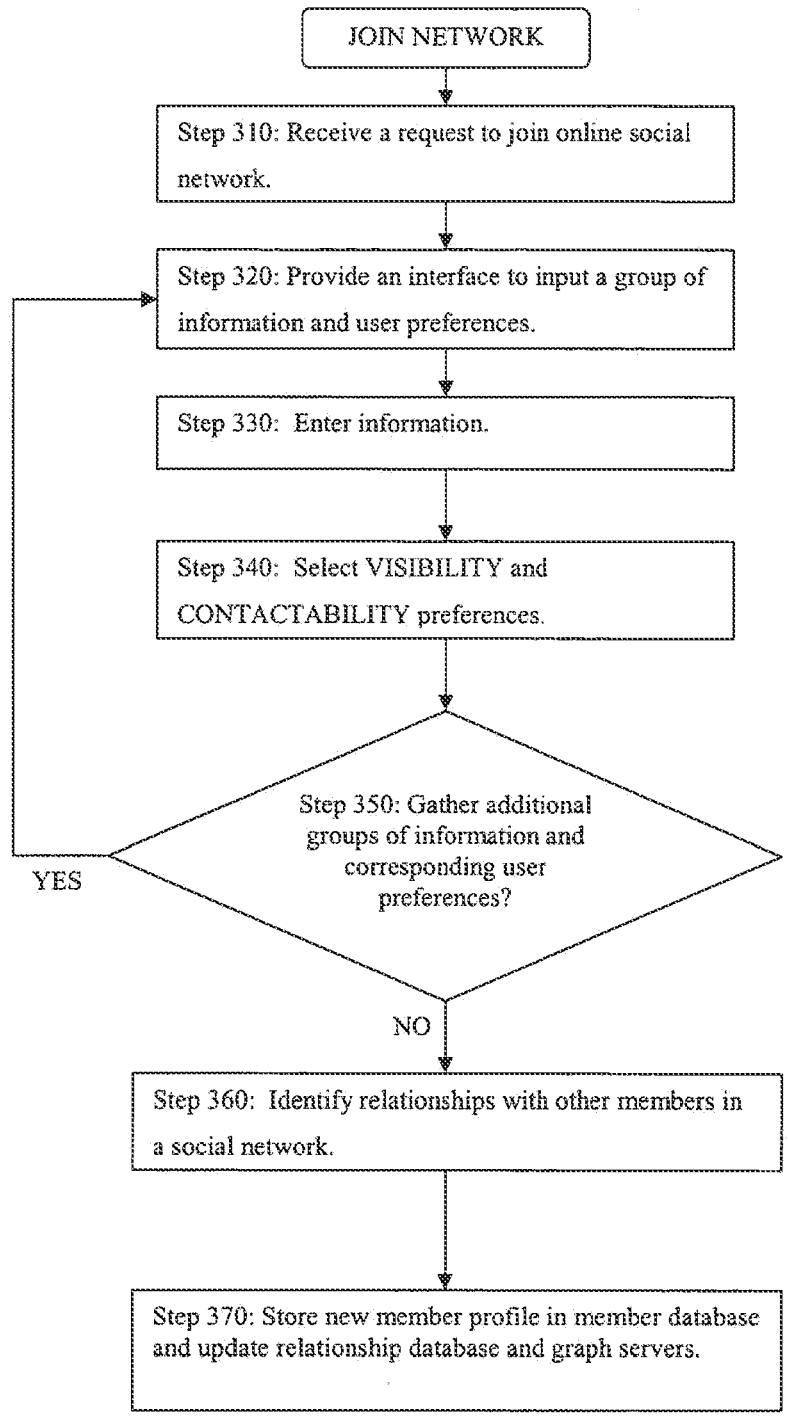
FIG. 3 is a flow diagram illustrating a method for becoming a member of an online social network and setting user preferences for different information blocks, according to one embodiment.

FIG. 3 is a flow diagram illustrating a method for processing a request from a potential new member to join an online social network. In Step 310, the application server 200 receives a request from the potential new member (NM1) to join the online social network. As an example, this may occur when NM1 clicks on a hyperlink navigating to the online social network's website. Potential new members may also request to join the online social network in response to a message from another existing member.

Figure 5A:
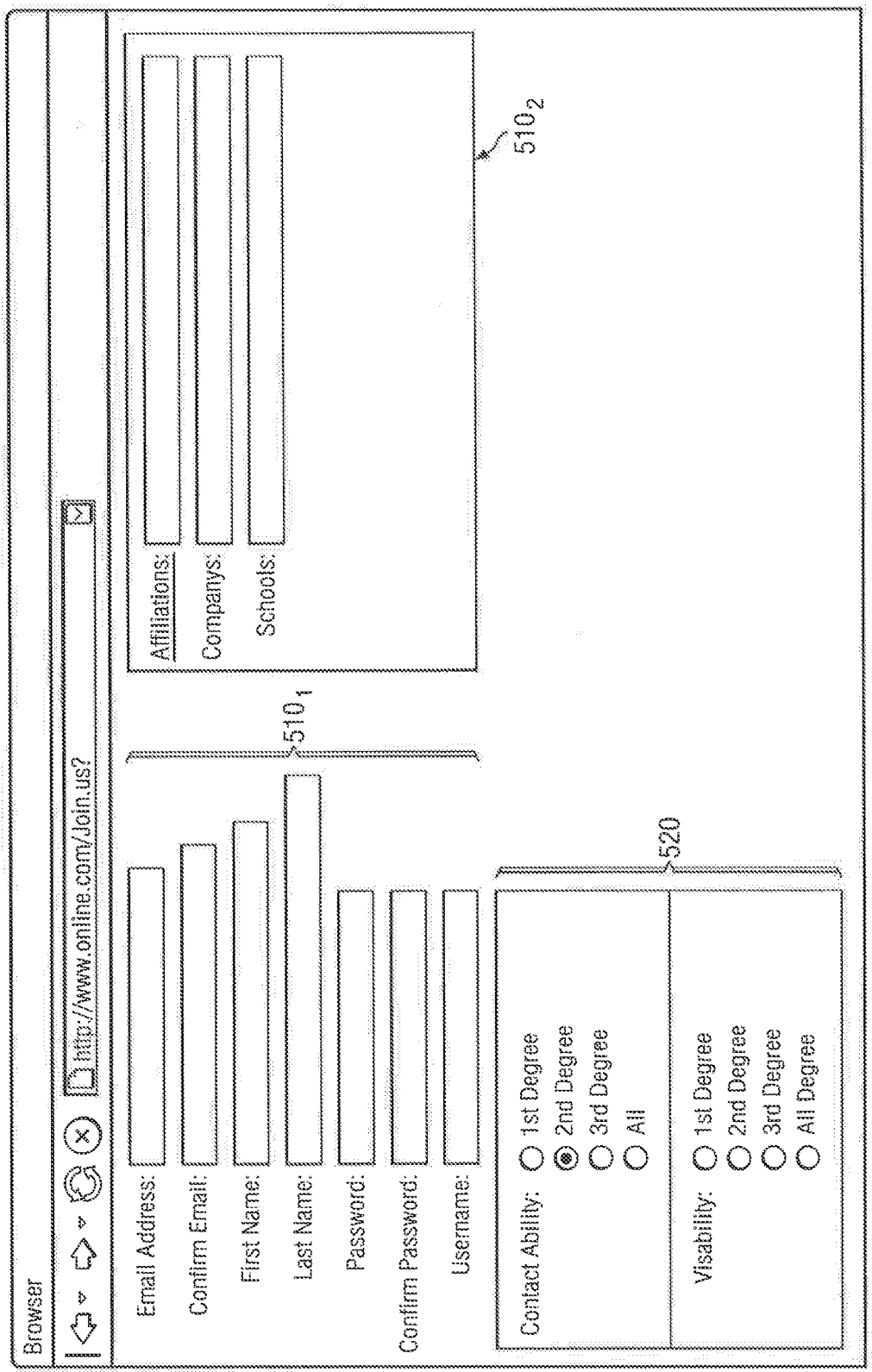
FIG. 5A illustrates a sample interface used in inputting member information including an interface for setting visibility and contactability preferences.

In Step 320, the application server 200 responds to NM1's request by providing NM1 with an interface to enter personal information and corresponding user preferences. FIG. 5A illustrates a webpage that allows NM1 to enter identifying information, including NM1's first and last name, email address and username. The interface may also allow NM1 to enter other personal information (e.g., affiliations, employers, locations, contact information for other potential new members etc.).

At Step 330, NM1 enters the information in the fields provided by the interface. As illustrated, FIG. 5 the web page also includes a set of radio buttons allowing NM1 to select VISIBILITY and CONTACTABILITY preferences giving NM1 greater control over the personal information that NM1 provides to the online social networking site.

At Step 340, NM1 sets VISIBILITY and CONTACTABILITY preferences for the information entered in Step 330. As the two identifiers suggest, the VISIBILITY and CONTACTABILITY preferences refer, respectively, to the flow of NM1's personal information to others and to the flow of information to NM1. As further described below in conjunction with FIGS. 4A-4B, the VISIBILITY setting defines the elements of NM1's personal information (e.g., member profile) that others may view, based on their degree of separation from NM1. On the other hand, the CONTACTABILITY setting limits who may communicate with NM1 (e.g., bye-mail, text messaging, voicemail, instant messaging, chat, or other similar means), also based on their degree of separation from NM1.

For some embodiments, the personal information collected by the online social networking site may be subdivided into different groups, and NM1 may selectively set the VISIBILITY and CONTACTABILITY preferences for each group. Accordingly, after Step 350, NM1 may repeat Steps 320 through 340 for additional information groups.

At Step 360, NM1 identifies relationships with other members (e.g., M2) of the online social network. For example, if NM1 is joining the online social network in response to a request from M2, NM1 may confirm that M2 is, in fact, NM1's friend (I.e., NM1 is separated from the requestor by 1 d/s). NM1 identifies any other relationships by specifying email addresses of NM1's friends.

In the preferred embodiment, before updating the databases 210, 220, 230 to reflect a new 1 d/s relationship between NM1 and another member, the other member is required to confirm that NM1 is a friend. Doing so prevents NM1 from falsely claiming that a first degree relationship exists with the other member when one does not. At Step 370, the application server 200 updates the databases 210, 220, 230 to reflect the new relationships in the social network graph.

As those skilled in the art will recognize, once NM1 has joined the social networking site, NM1 may add additional first degree relationships to NM1's social network at any time using the operations described above. Moreover, NM1 may be updating his or her social network as new 1 d/s connections are made. For example, NM1 may uncover an unknown third degree relationship with M3 by browsing through member profiles on the online social network site. Depending on such M3's contact preferences, NM1 may then contact and begin exchanging messages with M3. Later, NM1 may update the social network to indicate that he or she now has a first degree relationship with M3.

Figure 4A:
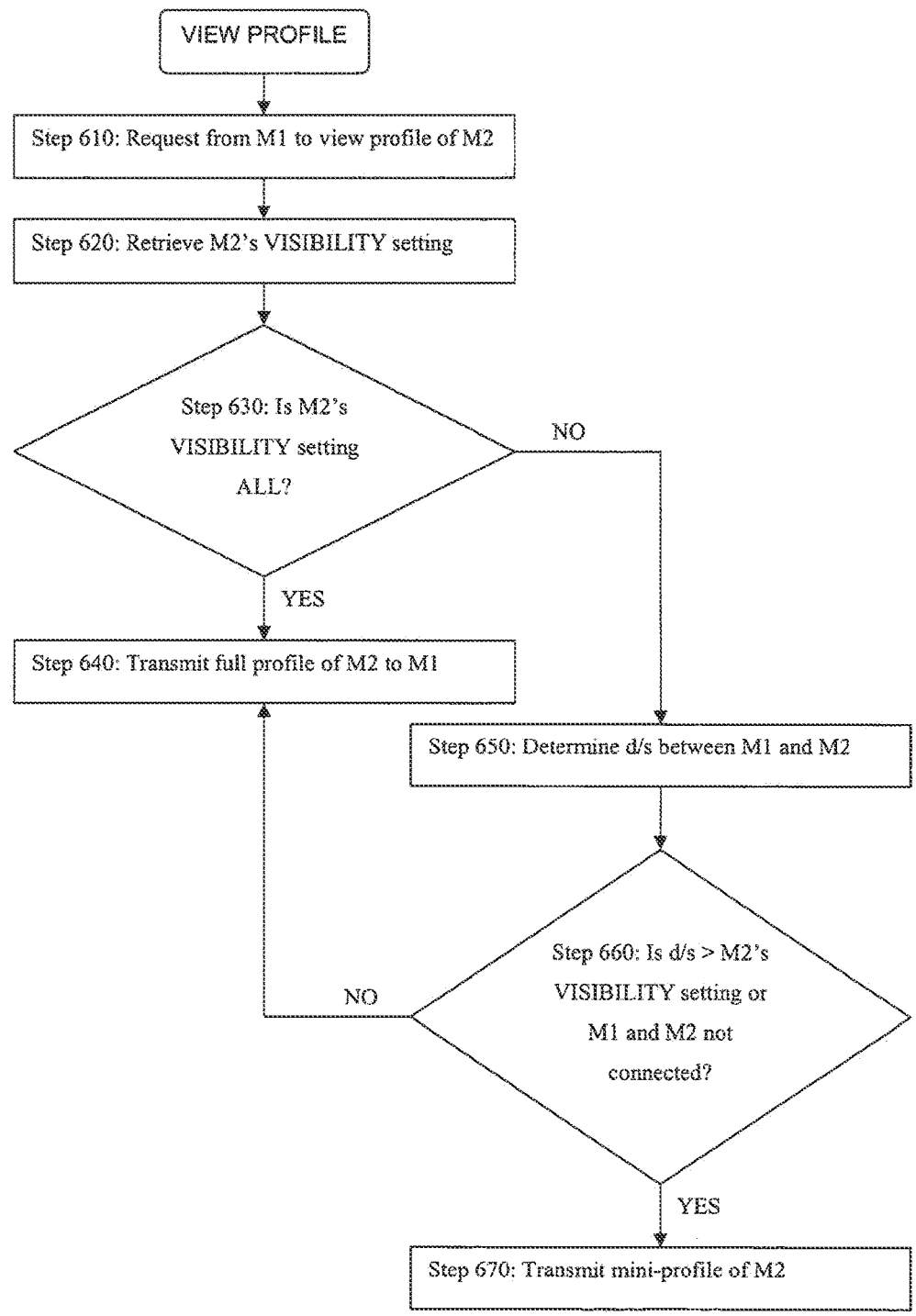
FIG. 4A is a flow diagram illustrating a method for processing a request by one member to view the profile of another member in the system of FIG. 2.

FIG. 4A is a flow diagram illustrating a method for processing a request by one member (e.g., M1) to view the profile of another member (e.g., M2) in the system of FIG. 2. As M1 interacts with the social network web site, M1 may request to view the profiles of other members. For example, M1 may view the profiles a member with whom M1 has a 1 d/s relationship (e.g., M1's friend MA). MA's profile may include references to MA's. 1 d/s relationships (which are also among M1's 2 d/s relationships). M1 may view successive member profiles, each time traversing an edge between two nodes in the social network. As M1 does so, M1 makes serial requests of the application server to view member profiles.

In Step 610, the application server 200 receives a request by member M1 to view the profile of member M2. If the d/s between M1 and M2 is less than or equal to M2's VISIBILITY preference or if M2's VISIBILITY preference is set to ALL, then the full profile of member M2 will be displayed. M2's VISIBILITY setting may be set at 1, 2, 3 or ALL, and settings 1, 2 and 3 correspond to degrees of separation, 1 d/s, 2 d/s and 3 d/s and ALL corresponds to all members, regardless of degree of separation.

In Step 620, the application server 200 retrieves M2's VISIBILITY setting from the member database 210. If M2's VISIBILITY setting is ALL, the full profile of M2 will be transmitted to M1 for display at M1's computer (Steps 630 and 640). If not, the application server 200 queries the graph servers 300 to determine the d/s between member M1 and member M2 (Steps 630 and 650). The graph servers 300 process the query and return the d/s between M1 and M2 to the application server 200.

If the d/s between M1 and M2 is greater than M2's VISIBILITY setting (or if M1 and M2 are not connected in the social network), only the mini-profile of member M2 will transmitted to M1's computer for display. (Steps 660 and 670). In the preferred embodiment, every member of the online social network has a miniprofile that includes a limited set of the personal information provided by each member as described above regarding FIG. 3. For example, the mini-profile may include only an image, first name and location. In some embodiments, the member may specify what's to be included in his or her mini-profile.

Otherwise, when the d/s between M1 and M2 is less than or equal to M2's VISIBILITY preference, the application server retrieves M2's full profile and transmits it to M1 for display at M1's computer (Steps 660 and 640). For some embodiments where the VISIBILITY and CONTACTIBILITY preferences are set for different elements within each member's profile, the application server 200 may return only some elements of M2's profile but not others.

Alternatively, for some embodiments, an online social network may not provide any information about M2 to M1 when the d/s between them is outside of M2's VISIBILITY preference. In such an embodiment, the application server 200 respond to M1's request to view M2's member profile by displaying an error message, or by displaying a "no profile found" message, and the application server 200 would also exclude M2's member profile from any search results displayed to M1.

Figure 4B:
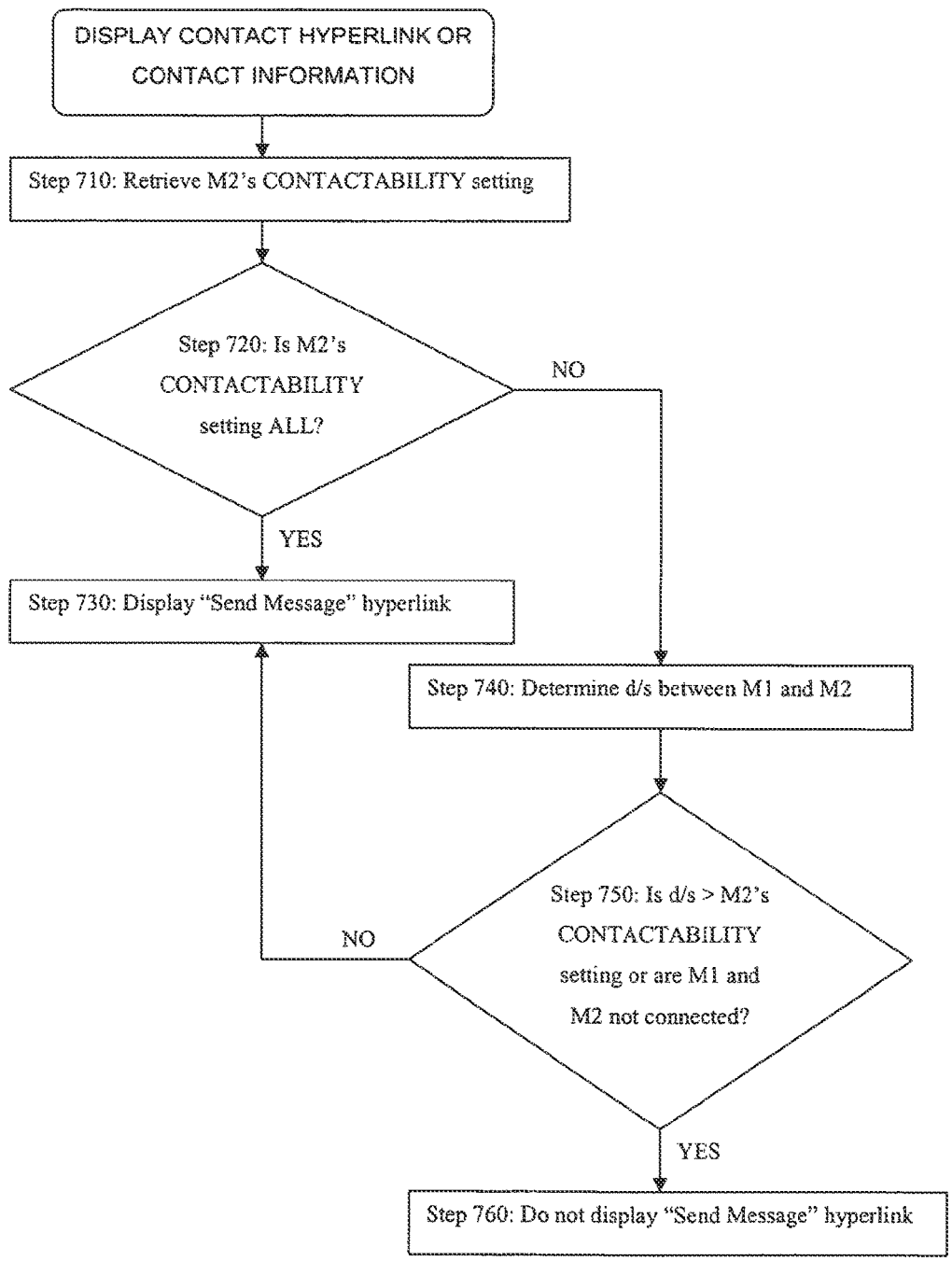
FIG. 4B is a flow diagram illustrating a method for determining whether a member can be contacted by another member in the system of FIG. 2.
Figure 4C:
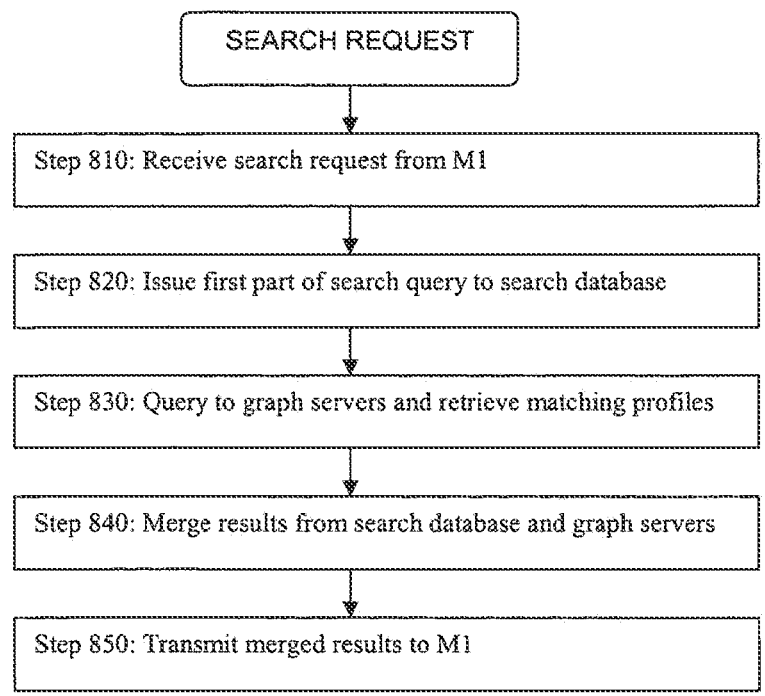
FIG. 4C is a flow diagram illustrating a method for processing a search request in the system of FIG. 2.

FIG. 4B is a flow diagram illustrating a method for managing information flow to a member based on the member's CONTACTIBILITY preference. The following example assumes that member M1 is viewing the full profile of another member M2. When the application server transmits M2's full profile to M1 according to the operations of FIG. 4A, the application server 200 may also determine whether M1 may initiate communications with M2.

In Step 710, the application server 200 retrieves the CONTACTABILITY setting of member M2. (e.g., CONTACTABILITY setting may be set as 1, 2, 3 or ALL.) If M2's CONTACTABILITY setting is ALL, M2 will permit contact from anyone, and consequently, when M1 views M2's profile, a "Send Message" hyperlink will appear which member M1 may click to send messages to member M1 (Steps 720 and 730).

If M2's CONTACTABILITY setting is less than ALL, the application server 200 queries the graph servers 300 to determine the d/s between member M1 and member M2 (Steps 720 and 740). The graph servers 300 process the query and return the d/s between M1 and M2 to the application server 200. If M2's CONTACTABILITY setting is less than the computed d/s (or if M1 and M2 are not connected), than M2 is not permitting contact from member M1 and the "Send Message" hyperlink will not be displayed when member M1 views member M2's profile (Steps 750 and 760). Conversely, if M2's CONTACTABILITY setting is greater than or equal to the computed d/s, this then M1 may send messages to M2, and consequently, when member M1 views M2's profile, a "Send Message" hyperlink, (or other mechanism allowing M1 to initiate contact with M2) may be displayed which member M1 clicks to send messages to member M1 (Steps 750 and 730).

FIG. 4C is a flow diagram illustrating the method for processing a search request in the system of FIG. 2. In Step 810, the application server 200 receives a search query entered by member M1. The search query may be divided into two parts. The first part specifies search limitations, if any, for categories such as gender, age, interests and location. The second part specifies a d/s setting, which may be set at 1, 2, 3 or ALL. For example, the search query may be: [gender (female), age (less than 30), d/s (at most 2)]. The first part of this search query is [gender (female), age (less than 30)] and the second part of this search query is [d/s (at most 2)]. In Step 820, the application server 200 issues the first part of the search query to the search database 230 to obtain a set of member identifiers that includes the members whose profiles meet the specified criteria. In Step 830, the application server 200 may query to the graph servers 300 to obtain a set of member identifiers of members that are within the d/s specified in the second part of the search query. The application server 200 merges the results from the search database 230 and the graph servers 300 (Step 840), and transmits the merged results to member M1 (Step 850). After the application server 200 delivers the merged results to member M1, the member may click on any of the results to view that member's profile according to the methods illustrated in FIGS. 4A and 4B.

Additionally, for some embodiments, the merged results may be further limited based on the VISIBILITY preference of each member included in the merged set. Some embodiments may not display mini-profiles in response to a request to a view a member's profile if the degree of separation between that member and the requesting member exceeds the VISIBILITY preference of that member. In such an embodiment, the search results may be further limited based on each matching members' VISIBILITY preference. For example, if M1 makes queries the application server 200 as described above with the following query: [gender (female), age (less than 30), d/s (at most 2)], the application 200 server would further limit the merged results by removing the profile of any member included in the merged results whose VISIBILITY preference is set to 1.

Figure 5B:
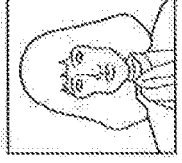
FIG. 5B illustrates a sample interface used in initiating a search request and selecting from search results.

FIGS. 5A and 5B illustrate two sample interfaces served on computers 500 for inputting information. FIG. 5A represents interface elements that may be used to input new member information. A new member may enter information using text fields 5101 and 5102. In addition, radio buttons 520 are provided to allow the new member to specify CONTACTABILITY and VISIBILITY preferences by a degree of separation of one, two, three or ALL.

FIG. 5B represents interface elements that a member may use to search the member profiles stored in the online social network according to the method of FIG. 4C. Specifically, FIG. 5B illustrates an interface allowing a user to enter the search query described above, according to one embodiment. The interface shows a member that has entered the search criteria of [gender (female), age (less than 30), d/s (at most 2)]. Additionally, search results show a list of members of the online social network that satisfy all of the search criteria. Member profile shows the details of profile associated with one member included in the search results.

In the embodiments described above, the ALL setting is used to signify all members within the online social network. Alternatively, the ALL setting could be used to signify anyone and everyone, such that, if a member has a VISIBILITY preference set at ALL, anyone, even those who are not members of the online social network, could access the member's personal information.

Furthermore, the preference settings of 1, 2, 3, or ALL can be generically viewed as permission levels, specified by a member of the online network, for any type of activity involving the member and another person. For example, a preference setting for SEARCHABILITY may be included as an item in the member's profile. When this setting is used, a member will not appear in another member's search results unless the other member is within the degree of separation specified in the SEARCHABILITY setting.

While particular embodiments have been illustrated and described above, those skilled in the art understand that the invention disclosed herein can take a variety of forms and embodiments within the scope of the appended claims.

What is claimed is:

1. A method comprising, by one or more computing systems of an online social network:

accessing, by an application server of the online social network from a member database of the online social network:
profile information of a first user comprising personal information and relationship information of the first user, wherein the personal information comprises a plurality of attribute values associated with the first user, and wherein the relationship information comprises one or more relationships between the first user and one or more users of the online social network; and
a visibility preference specified by the first user, wherein the visibility preference specifies a degree of separation in a social graph associated with the online social network, wherein the degree of separation specified by the visibility preference determines a flow of the first user's profile information to users of the online social network and a flow of information to the first user;
identifying, by the application server, one or more relationships between the first user and one or more second users of the online social network, respectively, based on a comparison of the personal information of the first user and personal information of each respective second user, wherein each relationship with a second user is identified based on one or more attribute values of their respective personal information matching one or more attribute values, respectively, of the first user, wherein the one or more matching attribute values are visible to the second user base on the degree of separation specified by the visibility preference of the first user; and
updating, by the application server, the relationship information of the first user in the social graph with the one or more identified relationships between the first user and one or more second users based on the one or more matching attribute values from their respective personal information.

2. The method of claim 1, wherein the personal information comprises one or more attribute types having one or more attribute values, wherein the attribute types comprise one or more of identifying information, individual personal attributes, affiliations, employers, locations, age, interests, or any combination thereof.

3. The method of claim 2, wherein the identifying information comprises one or more of an email address, text messaging identifier, voicemail identifier, instant messaging identifier, chat identifier, physical address, telephone number, or any combination thereof.

4. The method of claim 1, further comprising receiving, from a client device of the first user, a search query inputted by the first user, and wherein identifying relationships between the first user and one or more second users is responsive to receiving the search query.

5. The method of claim 4, wherein the personal information of each of the identified one or more second users matches a criteria specified in the search query.

6. The method of claim 5, wherein the criteria comprise gender, age, interests, location, a category, or any combination thereof.

7. The method of claim 4, wherein identifying relationships responsive to receiving the search query comprises:
identifying the second users from the member database, each identified user matching a criteria specified in the search query; and
retrieving, from the member database, personal information for each identified second user.

8. The method of claim 4, wherein identifying relationships responsive to receiving the search query comprises: retrieving relationship information for the one or more second users from a social graph.

9. The method of claim 4, wherein identifying relationships responsive to receiving the search query comprises:
identifying the second users from the member database, each identified user matching a criteria specified in the search query;
retrieving relationship information for each identified second user from the social graph; and
merging information associated with the identified second users with the relationship information, wherein updating the profile information of the first user from the member database with the identified relationships comprises updating the profile information of the first user from the member database with the merged information.

10. The method of claim 4, further comprising:
sending, to the client device of the first user in response to the search query, a search-results interface listing one or more of the second user.

11. The method of claim 1, further comprising determining, for each second user, whether to send profile information for the second user in accordance with a visibility preference specified by the second user.

12. The method of claim 11, further comprising:
sending, to a client device of the first user, only information comprising a mini-profile for each second user having a visibility preference limiting the first user from viewing information comprising a full profile for the second user.

13. The method of claim 3, further comprising determining, for each second user, whether to send identifying information for the second user to the first user in accordance with a visibility preference specified by the respective second user.

14. The method of claim 13, further comprising:
determining, for each second user, whether to send identifying information for the first user to the respective second user in accordance with the visibility preference specified by the first user.

15. The method of claim 1, further comprising:
accessing the social graph, wherein the social graph comprises a plurality of nodes and a plurality of edges connecting the nodes, wherein the plurality of nodes corresponds to a plurality of users of the online social network, respectively, each edge between two nodes representing a relationship between the corresponding users and establishing a single degree of separation between the users, wherein:
the first user corresponds to a first node of the plurality of nodes; and
the one or more second users correspond to one or more second nodes of the plurality of nodes, respectively.

16. The method of claim 15, wherein each second node is within a degree of separation of the first node specified by a visibility preference of the second user corresponding to the second node.

17. The method of claim 15, wherein updating the relationship information of the first user in the social graph comprises:
generating, responsive to each identified relationship between the first user and a second user, an edge in the social graph connecting the first node to the second node corresponding to the second user.

18. The method of claim 1, wherein the first user is separated from each respective second user by less than the degree of separation specified in the second user's visibility preference, wherein the attribute values of the profile information of the second user are visible to the first user if the first user is separated from the second user by less than the specified degree of separation.

19. The method of claim 1, wherein identifying relationships between the first user and one or more second users further comprises:
accessing, from the member database for each second user, a visibility preference specified by the respective second user, wherein the visibility preference specifies a degree of separation in a social graph associated with the online social network, wherein the degree of separation specified by the visibility preference determines a flow of the second user's profile information to users of the online social network and a flow of information to the second user;
determining, for each second user, whether the matching attribute values of the first user are visible to the first user based on the degree of separation specified by the visibility preference of the respective second user.

20. A system of an online social network comprising: one or more processors; and a non-transitory memory coupled to the processors comprising instructions executable by the processors, the processors operable when executing the instructions to:
access, by an application server of the online social network from a member database of the online social network:
profile information of a first user comprising personal information and relationship information of the first user, wherein the personal information comprises a plurality of attribute values associated with the first user, and wherein the relationship information comprises one or more relationships between the first user and one or more users of the online social network; and
a visibility preference specified by the first user, wherein the visibility preference specifies a degree of separation in a social graph associated with the online social network, wherein the degree of separation specified by the visibility preference determines a flow of the first user's profile information to users of the online social network and a flow of information to the first user;
identify, by the application server, one or more relationships between the first user and one or more second users of the online social network, respectively, based on a comparison of the personal information of the first user and personal information of each respective second user, wherein each relationship with a second user is identified based on one or more attribute values of their respective personal information matching one or more attribute values, respectively, of the first user, wherein the one or more matching attribute values are visible to the second user based on the degree of separation specified by the visibility preference of the first user; and
update, by the application server, the relationship information of the first user in the social graph with the one or more identified relationships between the first user and one or more second users based on the one or more matching attribute values from their respective personal information.

* * * * *